United States Patent
Lodenius

[19]

[11] Patent Number: 5,923,761
[45] Date of Patent: Jul. 13, 1999

[54] SINGLE CHIP SOLUTION FOR MULTIMEDIA GSM MOBILE STATION SYSTEMS

[75] Inventor: Johan Lodenius, Sunnyvale, Calif.

[73] Assignee: LSI Logic Corporation, Milpitas, Calif.

[21] Appl. No.: 09/035,223

[22] Filed: Mar. 5, 1998

Related U.S. Application Data

[63] Continuation of application No. 08/653,675, May 24, 1996, Pat. No. 5,799,091.

[51] Int. Cl.$^6$ .......................................................... H04L 9/00
[52] U.S. Cl. ............................ 380/49; 364/131; 375/295; 375/316; 380/9; 455/403; 455/422
[58] Field of Search ..................................... 380/9, 28, 29, 380/33, 37, 43, 49, 50, 59; 364/131, 132, 133, 134, 135, 136; 375/295, 316; 455/403, 410, 411, 422

[56] References Cited

U.S. PATENT DOCUMENTS

| | | | |
|---|---|---|---|
| 5,612,974 | 3/1997 | Astrachan | 375/295 |
| 5,621,800 | 4/1997 | Weng et al. | 380/49 |
| 5,799,091 | 8/1998 | Lodenius | 380/49 |

*Primary Examiner*—Bernarr E. Gregory
*Attorney, Agent, or Firm*—Mitchell, Silberberg & Knupp LLP

[57] ABSTRACT

According to the present invention, a single chip semiconductor devices is provided. In one version of the invention, a single chip CMOS technology architecture is used to implement all or various combinations of baseband radio transmission, baseband interfaces and filtering, source coding, source interfaces and filtering, control and supervision, power and clock management, keyboard and display drivers, memory management and code compaction, digital signal processing ("DSP") and DSP memory and radio interface functions.

22 Claims, 1 Drawing Sheet

5,923,761

SINGLE CHIP SOLUTION FOR MULTIMEDIA GSM MOBILE STATION SYSTEMS

This application is a continuation of co-pending U.S. patent application Ser. No. 08/653,675, filed May 24, 1996, now U.S. Pat. No. 5,799,091.

TECHNICAL FIELD OF THE INVENTION

This invention relates generally to mobile station systems, and particularly to a single chip semiconductor device providing all of the various functions required by mobile station systems.

BACKGROUND OF THE INVENTION

Various cellular radio or mobile telephone systems are presently in use to provide high quality, mobile communications over wide coverage areas. One such system is the digital mobile telephone system GSM (Groupe Special Mobile). Developments to the GSM standard are made within the European Telecommunication Standard Institute (ETSI) under the Special Mobile Group (SMG) technical committee. SMG has released the "GSM Technical Specifications" which are available from the Publications Office of ETSI, and are incorporated herein by reference as though set forth in full. The spectrum of applications which use GSM technology is extremely broad. For example, the applications include handheld, portable, transportable, PCMCIA, PC, PDA, Organizer, adapter cards, modems and other systems where GSM Mobile Station functionality is performed partly or completely.

Because of the wide variety of applications, the ability to implement new end-user services, Man Machine Interfaces (MMI) and various types of media into a GSM architecture is vital for commercial products. Moreover, to implement the GSM standard, numerous individual circuit modules are required to provide the resources to address the various functions supported by GSM. Therefore, to increase the versatility and cost effectiveness of a GSM product, it is desirable that the architecture efficiently share common resources. Also, since mobility is at issue, it is desirable that the physical size of the product be as small as possible.

In conventional GSM products, the modules for performing the functions required in a GSM system are typically discrete electrical circuits which are interconnected on a circuit board. Detailed examples of GSM modules are well known to those with skill in the art and are described in, for example, Mouly and Pautet, "The GSM System for Mobile Communications", (1992) (published by the authors) International Standard Book Number 2-9507190-0-7, incorporated herein by reference as though set forth in full. However, this type of system construction is limited with respect to the flexibility it can offer for adding new interfaces and MMI because changes to the functionality of the modules may require the architecture of the board to be re-designed. Additionally, it is also limited with respect to physical size by the space requirements of the mounted components. Therefore, it is an object of the present invention to provide a solution to the above mentioned problems, and to provide further advantages over the current art as will become clear in view of the following disclosure.

SUMMARY OF THE INVENTION

According to the present invention, a single chip semiconductor device is provided. In one version of the invention, a single chip CMOS technology architecture is used to implement all or various combinations of, mobile station functions such as baseband radio transmission, baseband interfaces and filtering, source coding, source interfaces and filtering, control and supervision, power and clock management, keyboard and display drivers, memory management and code compaction, digital signal processing ("DSP") and DSP memory and radio interface. Modules for performing these functions are arranged into three subsystems which are formed on a single semiconductor die, or chip: a Source Coding Bank (SCB), a Radio Transceiver (RTX) and a Control and Radio Interface (CRI). In a specific embodiment, a single chip semiconductor device useful in a GSM mobile station system which includes a radio frequency ("RF") module for transmitting and receiving radio signals is provided. In this embodiment, the semiconductor device comprises a source coding bank ("SCB") having a data port interface in electrical communication with a data codec, an audio interface in electrical communication with a speech codec, and a video interface in electrical communication with a video codec; a control-radio interface ("CRI") having a source codec selector in electrical communication with the data codec, the speech codec and the video codec; a radio transceiver ("RTX") in electrical communication with the CRI via an RTX control interface, the RTX having a baseband interface.

BRIEF DESCRIPTION OF THE DRAWINGS

The invention will be better understood by reference to the following drawing in which.

DETAILED DESCRIPTION OF EMBODIMENTS OF THE INVENTION

Figure 1:
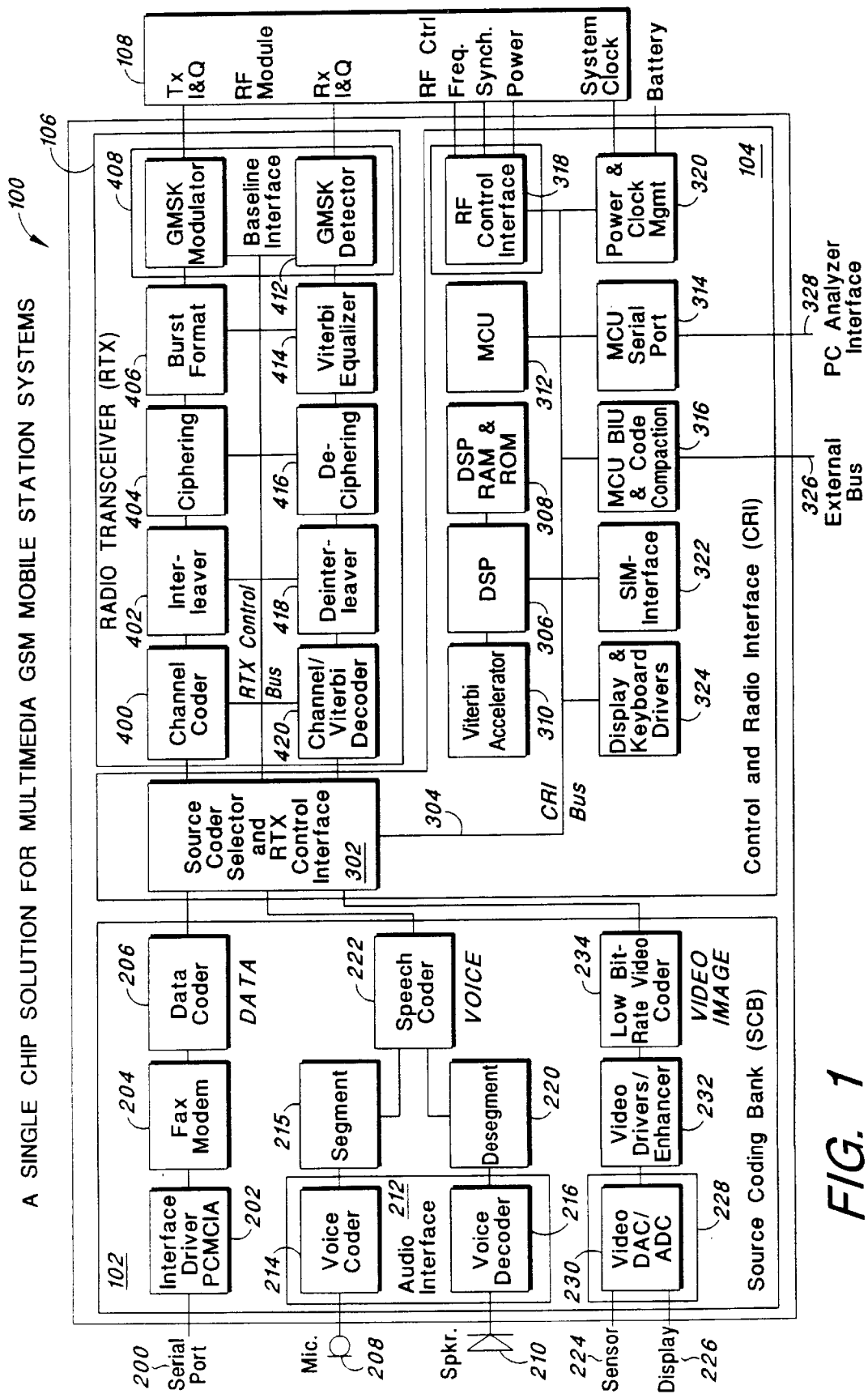
FIG. 1 is a block diagram of a single chip semiconductor device according to an embodiment of the invention.

For illustration of the embodiments described herein, "GSM" refers to GSM900 and the derivative DCS1800 and PCS 1900 standards. All these share the same structure for the functionality contained in the invention. The differences are primarily within the RF Module domain, the most important being use of different frequencies and power control, and therefore does not impact the content of the invention significantly. However, it is understood that the invention described herein could be adapted to other related communication standards.

Referring now to FIG. 1, there is shown a block diagram of a semiconductor device according to one embodiment of the invention. Those of skill in the art will recognize that, depending on the implementation, the three subsystems may contain various degrees of the complete functionality described in this particular embodiment This allows for optimization to meet the needs of the specific application. Also, it is to be understood that the functional blocks outlined in shadowed fields are, in some embodiments, implemented using analog or mixed signal cells as part of their functionality. This facilitates maximum utilization of the CMOS single chip and minimizes use of external components.

As shown, a single chip semiconductor device 100 for use in a GSM mobile station system is provided. The GSM system includes an external RF module 108 for transmitting and receiving radio signals. The RF module 108 also performs such functions as up- and down-conversion of baseband to IF and RF, and provides for control of frequency and power and PA and LNA for the front-end. The RF module 108 is not formed on the semiconductor device because typical RF modules require GaAs, BIP, or BiCMOS technology, special analog CMOS devices and a variety of discrete filters that are not cost-effectively integrated in standard CMOS. Therefore, the RF module 108 itself is not formed on the semiconductor device 100.

In one embodiment, the semiconductor device 100 comprises a source coding bank ("SCB") 102. The SCB 102 performs all functionality required for transmitting and receiving source data in form of voice, data/FAX and still or moving images to and from the GSM mobile station ("MS") user. This data may be in analog or digital format An appropriate mixed signal conversion function is used to adapt to an analog source and convert the signal to the digital domain. The SCB then compresses and/or adapts the data rate of the source data flow and connects to the GSM Channel Coder according to the specifications for GSM channel formats.

In a more specific embodiment, the SCB includes a data port interface 202, a FAX modem 204 and a data codec 206. These circuits perform interface, protocol conversion and data rate adaption between a data source such as a PC, PDA, FAX, data terminal, positioning and/or navigation system, electronic map and/or guidance system, telemetry and control equipment, wireline modem for POTS or ISDN and other wireless equipment. The data port interface 202 is any commonly used serial or parallel data interface such as RS-232, IEEE 802.3 or PCMCIA.

The data source codec converts the protocol and data rate to conform with the specified GSM channel formats. Common serial synchronous and asynchronous data formats and others, such as the Hayes AT command set and group 2 and 3 Fax can be implemented, as well as any other specified protocol required to interpret to from the mobile system. More complex data formats such as ISDN and ATM are also supported. In other embodiments of the invention, ETSI terminal adaptors are provided according to several standards such as GSM 05.03—Channel coding, GSM 07.01—General on terminal adaptation functions for MSs, GSM 07.02—Terminal adaptation functions for services using asynchronous bearer capabilities, and GSM 07.03—Terminal adaptation functions for services using synchronous bearer capabilities.

The SCB also has an audio interface 212 in electrical communication with a speech, or voice source, codec 222. The audio interface 212 comprises a voice coder 214 connectable to an external microphone 208, and a voice decoder 216 connectable to an external speaker 210. The audio interface 212 permits signal transmissions between the microphone 208, the speaker 210 and the speech codec 222. The speech codec 222 executes single or multiple speech codec algorithms as specified for GSM by ETSI and ANSI/TIA. In still a more specific embodiment, the audio interface 212 includes G.711 PCM Codec, clock generation, gain programmability and analog conversion functions. According to other embodiments, the speech codec 222 is provided with Acoustic Echo Cancellation to filter out residual received signals from the transmit data stream. This embodiment is particularly suited for use in automobile applications and enhanced hands free acoustic echo cancellation may be used to further reduce the feedback background noise level.

In still further embodiments of the invention, the SCB supports ETSI fill rate, half rate and enhanced full and half rate Speech Codecs and supportive functions according to commercial standards such as GSM 05.03—Channel coding, GSM 06.01—Speech processing functions: general description, GSM 06.10—GSM full rate speech transcoding, GSM 06.11—Substitution and muting of lost frames for full rate speech traffic channels, GSM 06.12—Comfort noise aspects for full rate speech traffic channels, GSM 06.31—Discontinuous Transmission (DTX) for full rate speech traffic channels, GSM 06.32—Voice Activity Detection (VAD), GSM 11.10—Mobile station conformity specifications, ETSI GSM Phase 2 documents for Half Rate and Enhanced Full Rate speech coding, and ANSI/TIA North American PCS 1900 Action Group (NPAG) speech codec and support functions according to J-STD-007—Enhanced Full Rate USI Codec (TIPI/95-124).

In still a further embodiment, the SCB includes a PCM Codec which interfaces with the GSM Speech Codec using either μ-law or A-law companding and 13-, 14- or 16-bit 8 kHz samples. Segmentation is used to convert from the continuous data-stream PCM format to the 20 ms burst format used in by the GSM system. The segmentation is performed by segmentation module 218 and de-segmentation module 220.

A semiconductor device according to an embodiment of the present invention includes a control-radio interface ("CRI") subsystem 104 having a source codec selector 300 in electrical communication with the data codec 206, the speech codec 222 and the video codec 234. The CRI subsystem 104 comprises a micro-control unit ("MCU") and a DSP which together perform all call processing, administration, system power/memory/clock management and RF control interface functions necessary to control and supervise the entire system and schedule the activities between the MS and the network, subsystems and functional blocks.

One function of the CRI subsystem 104 is the management and scheduling of RTX functional block events in relation to the real time call processing. Another function of the CRI subsystem is the ability to handle messages, software and hardware interrupts, as well as other scheduled and non-scheduled events occurring in the mobile station. In one specific embodiment, these functions are performed by the digital signal processing unit ("DSP") 306 and the MCU 312. In other versions of the invention, one or more DSP's or MCU's are used. The DSP and MCU engines are adaptable to run real time operating systems ("RTOS") in order to perform their required functions. In the embodiment shown, DSP 306 is in electrical connection with viterbi accelerator 310 and memory, e.g., RAM and/or ROM 308. Still further commonly used signal processing intense functions may be used complementary with the DSP engine.

A bus interface unit ("BIU") 316 is provided to support various types of RAM, ROM, EPROM, EEPROM, or other memory type, for external MCU memory. Data from this memory is transmitted over a connection to external bus 326. The BIU 316 also supports a code compaction unit which, when used with, for example, a 32-bit RISC MCU, the code size may be decreased by as much as 50%. As implemented, this embodiment realizes the decompaction function, interpreting the coded instructions and data from the memory. The compaction is done in, e.g., a C-code compiler. An additional benefit with the compaction process is that the code actually executes faster, since less instructions are needed to complete a given procedure.

In yet another embodiment of the invention, a dedicated serial port 314 or data source codec serial port is provided. The serial port 314 is used by the MCU for such purposes as downloading of data for software upgrades and debugging. Also, a GSM protocol stack analyzer may be connected to port 314 for testing of compliancy with GSM layer 1, 2 and 3 or simulation of various traffic cases.

Also provided is a power and clock management block 320. This module is designed to take its reference from the GSM system clock as recovered by the receiver and locked onto by a local oscillator. The oscillator and PLL/prescaler/synthesizer functions required may be implemented in this block. Typically the power management block will power down all other functional blocks on chips not in use and power up upon request from the MCU 312 based on the MS operational mode. In another embodiment, an on-chip oscillator is provided The on-chip oscillator should always be running to facilitate quick start-up procedures and minimize time for clock frequency adjustment.

An RF Control Interface 318 is provided to allow interface between various control procedures for power, frequency, loop gain, synchronization and other RF/AF Module tasks requiring supervision and control from the CRI. The RF control interface 318 consists of ADC's, DAC's, which may be relatively slow, and analog multiplexers.

Keyboard and display drivers 324 as well as the serial port for the GSM Subscriber Identity Module ("SIM") 322 are also part of the CRI. These drivers can be modified to adapt to a broad selection of color or monochrome, active or passive displays and support a standard or extended keyboard with special functions.

In other embodiments, the semiconductor device 100 includes a video block in the SCB 102. The video block comprises a video source codec 234 which is in electrical communication with video, or display drivers 232 and video DAC/ADC 230 which, in turn, interfaces with video sensor 224 and display 226. The video driver block is called upon from the CRI 104 for display of alphanumeric characters and computer-generated graphics.

The CRI 104 is provided with a bus 304 to provide communication between all modules, e.g., DSP 306, MCU 312 etc., which make up the CRI subsystem. The bus 304 allows the CRI modules to communication with the source code selector and RTX interface 300 for communication with the SCB 102 and RTX 106 subsystems. The source code selector and RTX control interface 300 supervises and synchronizes the RTX 106 as well as chooses the best source codec and data rate available based on traffic channel quality and system and user signaling at any given time. This feature provides the advantage that the most optimal error correction method is chosen for the channel codec. This enables the use of several source codecs or multimedia services on GSM traffic channels, as well as maximizes the utilization of the traffic channel based on thorough analysis of the real-time traffic and channel statistics available in the CRI 104.

The semiconductor device 100 is also provided with a radio transceiver ("RTX") subsystem 106. The modules making up the RTX 106 are connected via the RTX control bus 422. The RTX control bus 422 is also connected to the source code selector and RTX interface 300 thus allowing communication to the SCB 102 and CRI 104 subsystems.

The RTX 106 formats the source and signaling data into synchronized bursts and modulates and demodulates the signal for up- and down-conversion by the RF module 108 which transmits and receives radio signals over the GSM air interface ($\mu$m) to and from the radio base station.

To maintain the data content over distorted radio paths, secure the confidentiality of transmitted data and user ID and modulate/demodulate the signal, a series of events needs to be executed in both forward and reverse transmission directions. These events are provided for in various modules of the RTX 106. In one embodiment, a channel coder 400 and channel/viterbi decoder 420 are provided. Channel coding introduces redundancy into the data flow, increasing its rate by adding information calculated from the source data, in order to allow the detection and correction of signal errors introduced during transmission. Depending on the transmission mode, different codes are used. Several codes can also be concatenated (adding redundancy to an already coded signal). The codes used in GSM are Block convolutional codes, Fire codes and Parity codes.

In an other embodiment, interleaver 402 and deinterleaver 418 are provided. Interleaving mixes up the bits of several code words so that bits that are close to each other in the modulated signal are spread over several code words. The loss of an interleaved single burst results in an evenly distributed loss of data that can fully or partly be recovered by the channel coding.

In a further embodiment, deciphering module 404 and deciphering module 416 are provided. Ciphering modifies the data for protection against access by a non-authorized third party. It is achieved, for example, by performing an exclusive-or operation between a pseudo-random bit sequence and the bits of a normal burst. The algorithms used to generate the pseudo-random sequence are the A5/1 and A5/2, each providing slightly different security and complexity.

According to another embodiment, a burst format module 406 is provided. Burst formatting generates the various physical bursts and logical traffic and control channels specified in GSM. For physical bursts these include Normal burst—56.25 bits, Frequency correction burst—156.25 bits, Synchronization burst—156.25 bits, Access burst—83–151.25 bits and Dummy burst.

The RTX 106 also provides for the use of various traffic and control channels. For example, suitable traffic channels include: Traffic Channel (TCH), full rate for source data and THC, half rate-for source data. Suitable control channels include: a Frequency Correction Channel (FCCH) which carries information for frequency correction of the MS, a Synchronization Channel (SCH) which carries information for frame synchronization of the MS, a Broadcast Control Channel (BCCH) which broadcasts general information on a per base station request, a Paging Channel (PCH) which is used to search a MS, a Random Access Channel (RACH) which is used by MS to request allocation of a SDCCH, a Access Grant Channel (AGCH) which is used to allocate SDCCH to a MS, a Stand-alone Dedicated Control Channel (SDCCH) which is used for system signaling during call set-up, a Slow Associated Control Channel (SACCH) which is continuously used for power regulation, time alignment etc., and a Fast Associated Control Channel (FACCH), which steals capacity from the traffic channels for fast signaling needs.

In order to modulate and demodulate RF transmissions, the device 100 is provided with a baseband interface 408. Different modulating methods may be used in embodiments of the invention. One suitable modulation method is Gaussian Minimum Shift Keying (GMSK). In the embodiment shown, GMSK is performed by the GMSK modulator 410. The GMSK modulator 410 is a phase modulator that includes a feature for maintaining a constant envelope within a burst. To get smooth curve shapes when changing phase, the signal is filtered with a Gaussian passband, achieving a narrower bandwidth for the GMSK compared with an ordinary Minimum Shift Keying (MSK).

Demodulation is performed by the GMSK detector/demodulator module 412. In one embodiment, the demodulator module 412 is combined with a viterbi equalizer 414 is used for recovering the received signal that has been distorted along the radio path with shadowing, multipath propagation, effects and addition of spurious signals and noises. The demodulator module 412 estimates the most probable sequence of modulated data, given the received distorted signal and tries to eliminate or equalize any discrepancies. The viterbi equalizer 414 uses maximum likelihood techniques to find the most probable emitted signal, taking noise statistics and other assumptions into account, and uses a known training sequence enclosed in each burst for correlation. The Viterbi Equalizer 414 is also capable of detecting Doppler shifts for determination of speed, direction and location of mobile stations. In a further embodiment, the channel decoder 400 also uses soft decision data from the equalizer 414 to further improve error correction. Apart from the soft decision used, the channel decoder 400, de-interleaver 418 and de-ciphering module 416 perform the reverse of encoding functionality.

All functional blocks in the RTX are controlled and supervised by the CRI through the RTX Control Bus, allowing for flexible introduction of new wideband and multiple channels expected to be introduced in the GSM standard.

All mixed signal baseband conversion functions and filters necessary are also integrated as part of the RTX 106, using standard quadrature I and Q signals to ensure interoperation with a wide variety of RF modules. The Single Chip architecture also allows further integration up into the RF module 108 domain with no impact on other than the modulator/demodulator blocks of the RTX 106 and the RF control interface 104. Also, the RTX module 106 is designed according to relevant ETSI and ANSI/TIA specifications, for example, ETSI: GSM 05.01, Physical layer on the radio part, GSM 05.02, Multiplexing and multiple access on the radio path, GSM 05.03, Channel coding, GSM 05.04, Modulation, GSM 05.05, Radio transmission and reception, GSM 05.08, Radio subsystem link control, GSM 05.10, Radio subsystem synchronization, GSM 11.10, Mobile station conformity specifications, and ANSI/TIA: J-STD-007 (Tag 5) documentation.

From the above description, it will be appreciated that the semiconductor device 100 according to embodiments of the present invention allows for change in the functionality of the individual subsystems and their respective functional blocks independently and with minimum impact on the complete system architecture. Also, those of skill in the art will recognize it is possible to make functional additions to the chip with minimum architectural impact. For example, the chip could also contain other additional functionality such as: positioning and navigation systems, processing units for PC's and/or PDA's, additional Mobile Station features and various means for fixed and/or wireless communication not described here. Still further variations of the invention will occur to this of skill in the art without departing from the scope and spirit of the invention.

What is claimed is:

1. A single chip semiconductor device useful in a mobile station system, the semiconductor device comprising:
    a source coding bank having a data codec, a speech codec, a video codec, a data port interface in electrical communication with the data codec, an audio interface, in electrical communication with the speech codec, and a video interface having digital-to-analog and analog-to-digital converters in electrical communication with the video codec;
    a radio receiver in electrical communication with the source coding bank, the radio transceiver having a baseband interface.

2. A semiconductor device as in claim 1, further comprising a control-radio interface in electrical communication with the radio transceiver via radio transceiver control interface, said control-radio interface having a source codec selector in electrical communication with the data codec, the speech codec and the video codec, wherein the source codec selector performs selection based upon analysis of real-time traffic and channel statistics to maximize utilization of a traffic channel.

3. A semiconductor device as in claim 2, where the control-radio interface comprises a control-radio interface bus providing electrical communication between the source codec selector, the radio transceiver control interface and a plurality of functional modules.

4. A semiconductor device as in claim 3, wherein the plurality of functional modules comprises a digital signal processing module having an electronic memory and a Viterbi Accelerator circuit, wherein the digital signal processing module is adapted to run real time operating systems.

5. A semiconductor device as in claim 3, wherein the plurality of functional modules comprises an MCU and a BIU which provides electrical communication between the MCU and external electronic memory.

6. A semiconductor device as in claim 3, wherein the plurality of functional modules comprises a display driver and a keyboard driver.

7. A semiconductor device as in claim 3, wherein the plurality of functional modules comprises clock and power management circuitry, wherein the power management circuitry powers down all other functional blocks not in use and powers up on request.

8. A semiconductor device as in claim 7, further comprising an on-chip oscillator.

9. A semiconductor device as in claim 3, wherein the plurality of functional modules comprises a RF control interface.

10. A semiconductor device as in claim 2, wherein the radio transceiver is controlled by the control-radio interface, allowing for introduction of additional wideband channels.

11. A semiconductor device as in claim 1, wherein the device accepts data in ISDN format.

12. A semiconductor device as in claim 1, wherein the device accepts data in ATM format.

13. A semiconductor device as in claim 1, wherein the device accepts data from the group consisting of positioning data, navigation data, electronic map data, guidance system data, and telemetry data.

14. A semiconductor device as in claim 1, wherein the speech codec includes acoustic echo cancellation to filter out residual received signals.

15. A semiconductor device as in claim 1, wherein the data port interface comprises a serial port interface driver in electrical communication with a FAX modem and the audio interface comprises a voice coder for receiving electrical signals from a microphone, and a voice decoder for providing signals to a speaker.

16. A semiconductor device as in claim 1, wherein the video interface and video codec are adapted for display of alphanumeric characters and computer-generated graphics.

17. A semiconductor device as in claim 1, wherein the radio transceiver provides for use of a plurality of traffic channels and a plurality of control channels.

18. A semiconductor device as in claim 1, wherein the radio transceiver comprises mixed signal baseband conversion circuitry and filters using standard quadrature I and Q signals.

19. A semiconductor device as in claim 1, wherein the radio transceiver further comprises a radio transceiver control bus which provides electrical communication between the source code selector, the radio transceiver control interface, the baseband interface and a plurality of radio transceiver functional modules.

20. A semiconductor device as in claim 19, wherein the plurality of radio transceiver functional modules comprises a channel coder and a channel-viterbi decoder.

21. A semiconductor device as in claim 19, wherein the plurality of radio transceiver functional modules comprises circuits for interleaving a ciphering transmission signals which are provided to the baseband interface, and circuits for deinterleaving and deciphering received signals from the baseband interface.

22. A semiconductor device as in claim 19, wherein the plurality of radio transceiver functional modules comprises a burst format circuit.

* * * * *